United States Patent [19]
Giacona, III

[11] Patent Number: 6,036,066
[45] Date of Patent: Mar. 14, 2000

[54] BOTTLED DRINK CARRIER APPARATUS

[75] Inventor: Corrado Giacona, III, New Orleans, La.

[73] Assignee: Giacona Container Company, Jefferson, La.

[21] Appl. No.: 09/138,108

[22] Filed: Aug. 21, 1998

[51] Int. Cl.$^7$ .................................................. A45F 3/16
[52] U.S. Cl. .................... 224/148.6; 24/3.13; 24/136 R; 224/250; 224/258
[58] Field of Search .............................. 224/148.6, 148.5, 224/250, 257, 258, 103, 921; 24/136 R, 3.13

[56] References Cited

U.S. PATENT DOCUMENTS

| | | |
|---|---|---|
| D. 284,421 | 7/1986 | Siris . |
| D. 304,890 | 12/1989 | Canaan . |
| D. 315,477 | 3/1991 | Shearer . |
| D. 373,677 | 9/1996 | Kelly . |
| 1,586,251 | 5/1926 | Lang ........................................ 224/258 |
| 1,605,595 | 11/1926 | Lang ........................................ 224/258 |
| 1,637,003 | 7/1927 | Lang ........................................ 224/258 |
| 1,660,740 | 2/1928 | Bailey ...................................... 224/258 |
| 2,247,867 | 7/1941 | Baumann ................................. 224/258 |
| 2,273,136 | 2/1942 | Orech et al. ............................. 224/258 |
| 2,284,069 | 5/1942 | Robertson ................................ 224/258 |
| 2,494,632 | 1/1950 | Rodin ..................................... 224/148.5 |
| 2,793,901 | 5/1957 | Johnson . |
| 3,065,944 | 11/1962 | Liebendorfer ......................... 224/148.5 |
| 3,977,638 | 8/1976 | Woodard ............................... 224/148.6 |
| 4,248,366 | 2/1981 | Christiansen . |
| 4,878,269 | 11/1989 | Anscher et al. ....................... 24/136 R |
| 5,148,926 | 9/1992 | Cocuzzo et al. . |
| 5,427,259 | 6/1995 | Krastanov . |
| 5,454,497 | 10/1995 | Kettelson . |
| 5,459,903 | 10/1995 | Treacy ..................................... 24/3.13 |
| 5,497,818 | 3/1996 | Marcarelli .............................. 224/253 |
| 5,577,647 | 11/1996 | Pittarelli et al. . |
| 5,782,390 | 7/1998 | Dorney ................................. 224/148.6 |

*Primary Examiner*—Stephen P. Garbe
*Attorney, Agent, or Firm*—Garvey, Smith, Nehrbass & Doody, L.L.C.

[57] ABSTRACT

A bottled drink carrier apparatus is provided for supporting a bottle containing a drink product at a position upon a user's neck or shoulder. The apparatus includes a strap assembly forming a loop having upper and lower end portions, a cable having ends that are attached to the lower portion of the strap assembly. The cable forms a closed noose with a slide below the strap. A slide is provided for tightening the noose about a bottle to be supported, the slide fictionally engaging the cable at least in the locking position.

15 Claims, 2 Drawing Sheets

BOTTLED DRINK CARRIER APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for supporting a bottled drink in close proximity to a user. Even more particularly, the present invention relates to a bottled drink carrier apparatus wherein the carrier has a strap that can be affixed to a user's neck or shoulder area and wherein a connection enables a bottle to be secured with a small cable portion of the apparatus that is much smaller in diameter than the maximum thickness of the strap.

2. General Background of the Invention

Most beverages are sold today in disposable containers that are made of plastic to be recycled after use. These bottled drink products are used for a number of different products such as soft drinks, spring water, colas, lemonade, sport drinks and the like. A number of similarly configured bottles are manufactured of glass.

During outdoor events such as sporting events, festivals, concerts, gatherings and the like, individuals typically carry such bottled drink products with them, thus requiring continuous use of one hand. In the past, there have been sold bottled drink carriers for holding such drink products so that the user can have full use of both hands. One such prior art device is in the form of an elongated strap supporting a foam insulated sleeve at the lower end of the strap. The foam sleeve has a cylindrically shaped recess for carrying a drink bottle or can.

One of the problems of prior art type bottled drink carriers is that they are cumbersome to use and operate.

The following U.S. Patents are incorporated herein by reference:

U.S. Pat. Nos. 2,793,901; 4,248,366; 5,148,926; 5,427,259; 5,454,497; 5,577,647; D284,421; D304,890; D315,477; and D373,677.

BRIEF SUMMARY OF THE INVENTION

The present invention provides an improved bottled drink carrier apparatus that easily be carried by the user at the neck or shoulder area. The apparatus includes a strap assembly having an upper end and a lower end.

A small cable forms a connector for connecting a bottle to the lower end of the strap member. The cable portion has first and second ends, each end being connected, preferably stitched, to the lower end of the strap member, at folded end portions of the strap member.

A slide is provided having apertures through which the cable can extend. The combination of the slide and cable define an adjustable noose formed by the cable below the slide during use.

Sliding movement of the slide upon the cable changes the size of the noose, so that the noose can grip the neck area of a bottled drink despite the diameter of the bottle at the neck area.

The slide has a catch that is moveable between "release" and "gripping" positions, the slide gripping the cable in the gripping position. In order to adjust the noose, the slide is moved upon the cable when the slide is in the "release" position, until a desired noose size is obtained.

The cable is preferably much smaller in diameter than the maximum width of the strap so that the cable can be made very small and lightweight. The larger strap can carry printed and/or artistic matter. The cable can thus fit very small recesses that are often provided on bottled drink products at the neck area. This small diameter cable can thus "double" as a carrier of other objects than bottles, such as sunglasses, cosmetic products, sunscreen containers, suntan oil containers, food containers and the like.

The user can drink from the bottle while the strap and loop member remain affixed to the user's neck or shoulder and the noose is connected to the bottle.

The cable can, for example, be between about 3 and 12 inches in length and have a thickness of between about $1/16$ and $1/4$ inches. The strap has a maximum thickness of about 1–3 inches. This enables the cable to be doubled upon itself with its free ends stitched to the remainder (cable) of the apparatus. In such a situation, the noose is of a diameter of about 1 to 6 inches which is adequate to affix the noose to most drink products at the neck area of the bottle and still provide adjustability with the slide.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
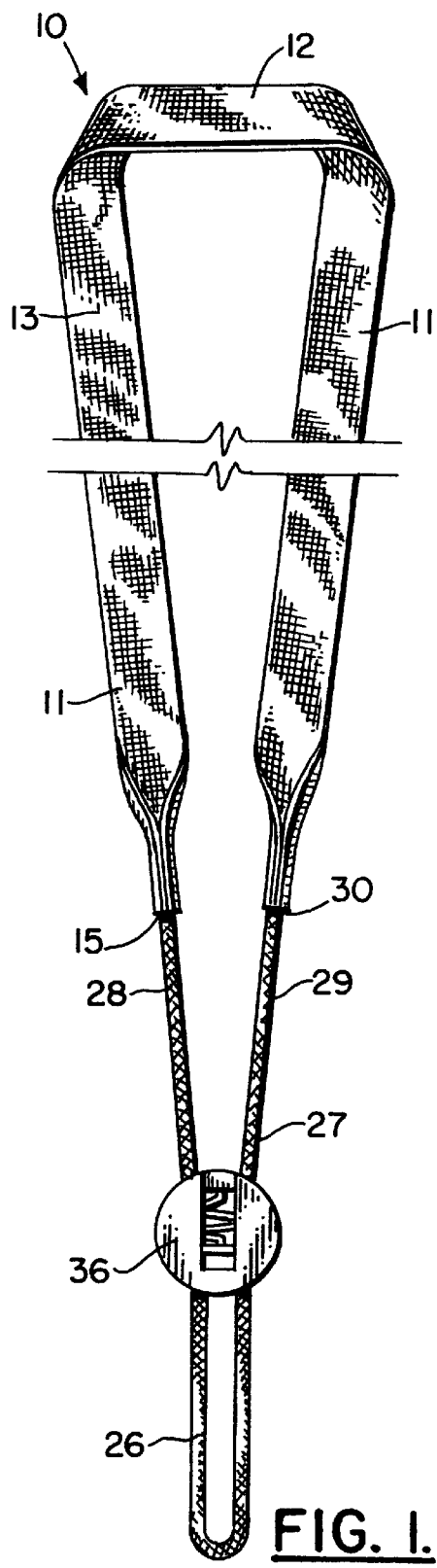
FIG. 1 is a front elevational view of the preferred embodiment of the apparatus of the present invention.
Figure 2:
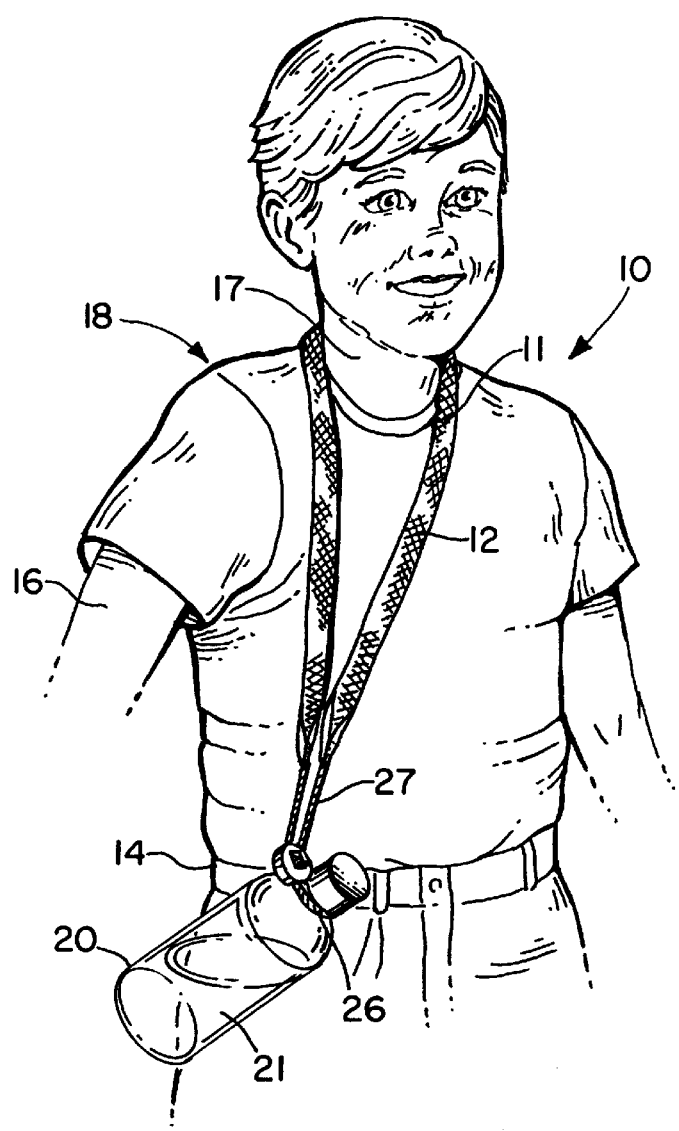
FIG. 2 is a perspective view of the preferred embodiment of the apparatus of the present invention showing it during use attached to a user's neck area.

FIGS. 1 and 2 show generally the preferred embodiment of the apparatus of the present invention designated generally by the numeral 10. Bottled drink carrier apparatus 10 can be attached to the neck or shoulder areas 17, 18 of a user 16 with a large strap member 11 as shown in FIGS. 1 and 2.

The strap member 11 includes a front surface 12 and rear surface 13. The strap 11 can be webbing material, web fabric, plastic, rubber or leather material between about one and three inches in maximum width, preferably between one and two inches in maximum width, and more preferably between one and one and a half inches in maximum width. This width enables printed and/or artwork or photographic matter to be added to strap 11. The strap 11 is preferably of a length that places bottle 20 at the user's torso area 14. The webbing width allows information or designs to be printed on the webbing without being so wide as to be cumbersome or uncomfortable. The webbing is preferably about 10"–64" long. More preferably, the webbing is about 15"–52" long, and for example about 29" or 40" long. The webbing can be made of any suitable material, and preferably one which is strong and durable. The webbing is preferably made of unstarched polyester (polyester without sizing), such as is commercially available from Tape Craft.

The apparatus 10 of the present invention enables the user 16 to support a bottle 20 containing a drink product 21 (see FIG. 2) by securing the bottle neck 22 with an adjustable noose 26 as will be described more fully hereinafter. Some bottle neck portions 22 typically provide a recess or groove 24 that can for example be defined by the bottle top 25 and an annular flange 23, both being positioned at the neck area 22.

Figure 3:
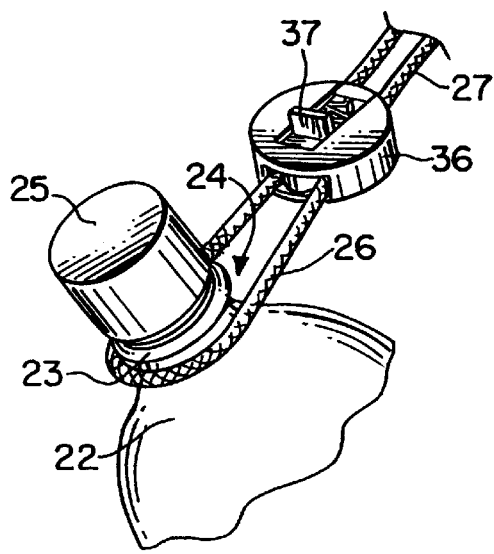
FIG. 3 is a fragmentary perspective view of the preferred embodiment of the apparatus of the present invention showing the noose in an open position, and prior to tightening of the noose about the neck area of a bottle.
Figure 4:
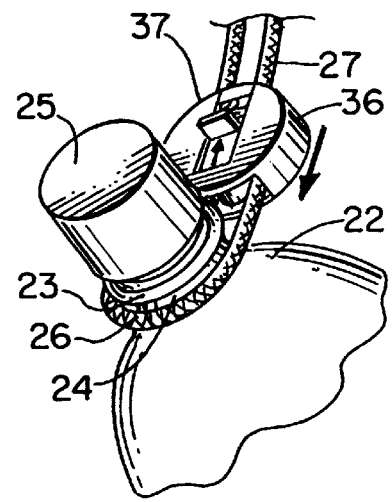
FIG. 4 is a partial perspective fragmentary view of the preferred embodiment of the apparatus of the present invention showing the noose in a closed, tightened position about the neck area of a bottle.

In FIG. 1, 3 and 4, the noose 26 is shown as being comprised of a relatively small diameter cord or cable 27 having end portions 28, 29 that are attached by stitching at 15, 30 for example to strap 31. Stitching 15, 30 is preferably bar tack stitching. This stitching is a zig-zag stitching which secures the strap and the cord together well. This cable 27 is preferably of a much smaller diameter than the maximum thickness of large loop member 11.

The cable 27 has a thickness of between about 1/32 inches and 1/4 inches. The loop 11 and strap 31 have widths of between about 1 and 3 inches. The cable 27 can be between about 3"–60" long, preferably between 6"–45" long, for example 15" long. The cable 27 can be made of any suitable rope or cable material such as polyethylene, braided polyethylene, or the like. Such cable is commercially available from a number of sources such as Franklin Braid of Emporia, Va.

Figure 5:
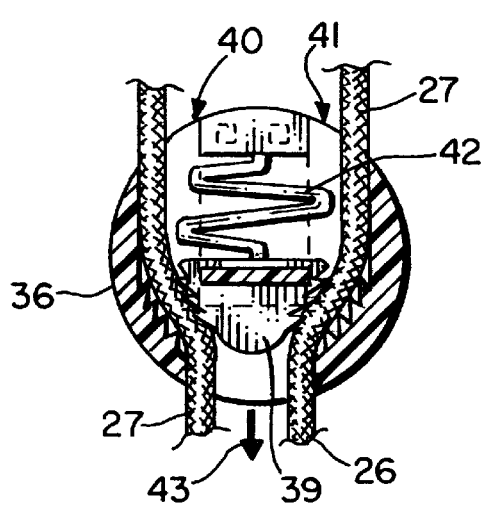
FIG. 5 is a front cutaway view of slide portion that can be used as part of the apparatus of the present invention, showing the slide in a closed or gripping position.
Figure 6:
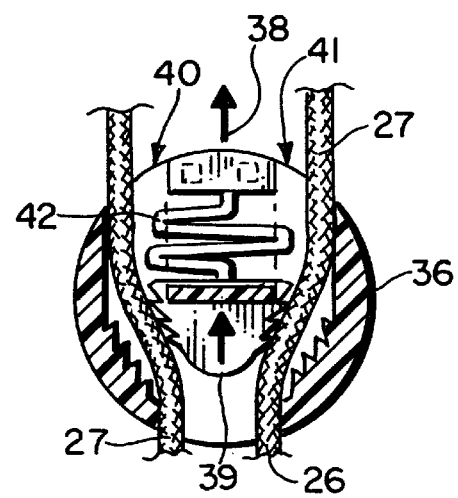
FIG. 6 is a front cutaway view of slide portion that can be used as part of the apparatus of the present invention, showing the slide in an open or released position.

In order to change the size of noose 26, a slide lock 36 is provided. The slide lock 36 provides a trigger 37 that can be operated with a user's thumb. In order to release the slide lock 36 so that it can adjust the size of the noose 26, the trigger 37 is moved in the direction of arrow 38 as shown in FIG. 6. This movement also releases the locking member 39 so that the cable 27 can slide through opposed passageways 40, 41. In order to lock the slide 36 to the cable 27 thus defining the size of the noose 26, the user simply releases the trigger 37. This enables return spring 42 to move the locking the member 39 to the gripping position of FIG. 5 as shown by arrow 43. The slide lock can be any suitable cord or cable lock or like means to reduce the diameter of the noose 26 and hold it in a reduced position. A preferred lock is a Duraflex brand lock made by National Molding of New York. The noose 26 has a diameter of between about 1" and 24", preferably between about 1" and 18", and most preferably between about 1" and 12". A typical maximum diameter for the noose 26 is about 4".

The following table lists the parts numbers and parts descriptions as used herein and in the drawings attached hereto.

| PARTS LIST | |
|---|---|
| Part Number | Description |
| 10 | bottled drink carrier apparatus |
| 11 | strap member |
| 12 | front surface |
| 13 | rear surface |
| 14 | user's torso |
| 15 | stitching |
| 16 | user |
| 17 | user's neck |
| 18 | user's shoulder |
| 19 | |
| 20 | bottle |
| 21 | drink product |
| 22 | bottle neck |
| 23 | annular flange |
| 24 | recess |
| 25 | bottle top |
| 26 | noose |
| 27 | cable |
| 28 | cable end |
| 29 | cable end |
| 30 | stitching |
| 36 | slide lock |
| 37 | trigger |
| 38 | arrow |
| 39 | locking member |
| 40 | passageway |
| 41 | passageway |
| 42 | spring |
| 43 | arrow |

The foregoing embodiments are presented by way of example only; the scope of the present invention is to be limited only by the following claims.

I claim:

1. A bottled drink carrier apparatus comprising:

a) a strap member that forms a loop for enabling an attachment about a user's neck or shoulder, the strap member having strap end portions;

b) a cable having first and second cable end portions, the cable end portions being connected respectively to the strap end portions;

c) a slide lock having spaced-apart apertures through which the cable can extend; and d) an adjustable noose formed the cable below the slide lock during use, wherein sliding movement of the slide lock upon the cable changes the size of the noose so that the noose can adjustably grip a bottled drink selected by a user; and e) wherein the slide lock has a catch that is movable between "release" and "gripping" positions, the slide lock gripping the cable in the gripping position, the slide lock being slidable upon the cable in the release position.

2. The bottled drink carrier of claim 1 wherein the cable has a diameter of between 1/32" and 1/2".

3. The bottled drink carrier of claim 1 wherein the cable has a diameter of about 1/8".

4. A bottled drink carrier apparatus comprising:

a strap member that forms a loop for enabling an attachment about a user's neck or shoulder, the strap member having strap end portions;

b) a cable having first and second cable end portions the cable end portions being connected respectively to the strap end portions;

c) folds at each of the strap end portions, the folds joining the strap to the cable with a connection;

d) a slide lock having spaced-apart apertures through which the cable can extend, e) an adjustable noose formed by the cable below the slide lock during use, wherein sliding movement of the slide lock upon the cable changes the size of the noose so that the noose can adjustably grip a bottled drink selected by a user; and f) wherein the slide lock has a catch that is movable between "release" and "gripping" positions, the slide lock gripping the cable in the gripping position, the slide lock being slidable upon the cable in the release position.

5. The bottled drink carrier of claim 4 wherein the connection includes stitching.

6. The bottled drink carrier of claim 4 wherein the cable has a cable thickness and the strap member has a maximum width, the maximum width being much greater than the cable thickness.

7. The bottled drink carrier of claim 4 wherein the cable has a cable diameter and the strap member has a maximum width, the maximum width being much greater than the cable diameter.

8. The bottled drink carrier of claim 5 wherein each fold encapsulates an end of the cable.

9. The bottled drink carrier of claim 1 wherein the cable is between about 3 and 60 inches long.

10. A bottled drink carrier apparatus comprising:

a) a strap that forms a loop member for enabling an attachment to a user's neck or shoulder area;

b) a strap member having a first strap end and a second strap end;

c) a cable having first and second cable ends, each cable end connected respectively to a strap end;

d) folds at the ends of the strap for connecting to the respective ends of the cable;

e) a slide lock having at least one slide opening through which the cable can extend, the strap member having a maximum thickness that is too large to fit the strap member through the slide opening; and f) an adjustable noose formed by the cable below the slide lock during use, g) wherein sliding movement of the slide lock upon the cable changes the size of the noose so that the noose can grip a bottled drink selected by a user, and wherein the strap functions as a stop to limit movement of the slide.

11. The bottled drink carrier of claim 10 wherein a fold and a cable end are joined with stitching.

12. The bottled drink carrier of claim 10 wherein the slide lock has a catch that is moveable between "release" and "gripping" positions, the slide lock gripping the cable in the gripping position, the slide sliding upon the cable in the release position.

13. The bottled drink carrier of claim 10 wherein the cable has a cable thickness and the loop member has a maximum width, the maximum width being much greater than the cable thickness.

14. The bottled drink carrier of claim 10 wherein the cable has a cable diameter and the strap member has a maximum width, the maximum width being much greater than the cable diameter.

15. The bottled drink carrier of claim 10 wherein the length of the cable is about one third the length of the strap.

* * * * *